No. 741,622. PATENTED OCT. 20, 1903.
S. G. BROWN.
SYSTEM OF WIRELESS TELEGRAPHY.
APPLICATION FILED JAN. 23, 1900.
NO MODEL.
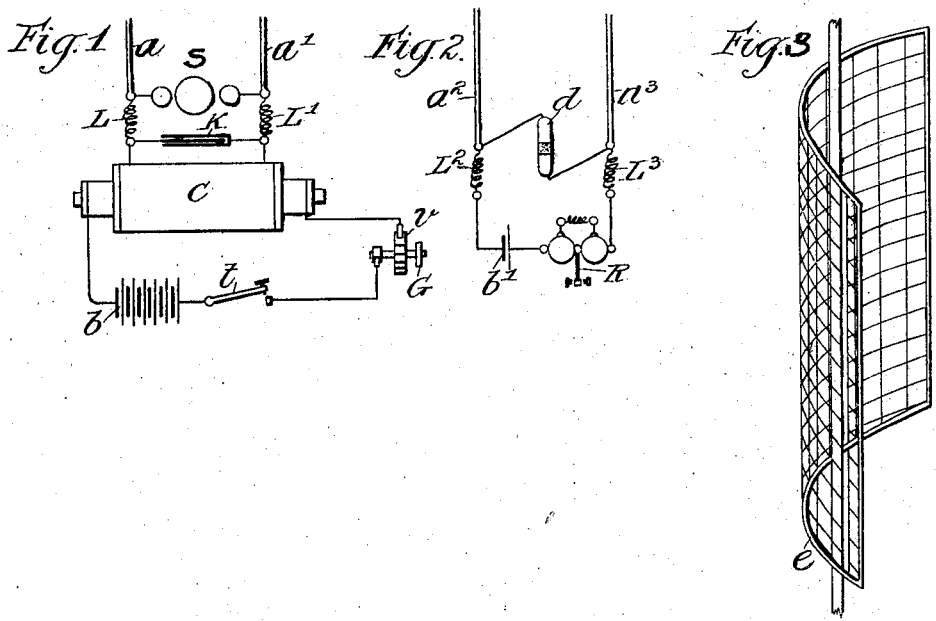
Witnesses.
Inventor.
Sidney G. Brown
by his Attorney.

No. 741,622. Patented October 20, 1903.

UNITED STATES PATENT OFFICE.

SIDNEY GEORGE BROWN, OF BOURNEMOUTH, ENGLAND.

SYSTEM OF WIRELESS TELEGRAPHY.

SPECIFICATION forming part of Letters Patent No. 741,622, dated October 20, 1903.

Application filed January 23, 1900. Serial No. 2,483. (No model.)

*To all whom it may concern:*

Be it known that I, SIDNEY GEORGE BROWN, electrician, a subject of the Queen of Great Britain, residing at Van Buren, Poole Road, Bournemouth, in the county of Hants, England, have invented an Improved System of Wireless Telegraphy, of which the following is a specification.

This invention relates to an improved system of wireless telegraphy, and has for its object to simplify and to increase the efficiency of the apparatus, to increase the speed of signaling, to enable messages to be transmitted to and received from one direction only, and to so adjust the apparatus that it is not affected by and does not affect neighboring systems.

According to this invention the transmitting apparatus is provided with two radiating-wires coupled one to each terminal of the sparking device and the receiving apparatus is provided with two receiving-wires coupled one to each terminal of the coherer. These radiating and receiving wires are respectively placed at a distance apart which has a definite relation to the length of the signaling-waves, that of half a wave length or approximately half a wave length being the most convenient distance. This placing of the wires half a wave length apart causes the system to send its waves to or receive them from mainly one direction, which direction would seem to be that of the plane of the wires. If the vertical wires were not so carefully adjusted to the wave length, they would transmit or receive the Hertzian waves from any direction. By arranging a condenser across the high-potential terminals of the spark-coil and joining the terminals of this condenser to the spark-balls through highly-inductive coils I can increase the persistence of the waves, the condenser acting as a storage of power and maintaining the potential at each side of the spark-gap. The highly-inductive coils prevent the charge in the condenser from itself oscillating across the spark-gap. By thus increasing the persistence of the train of Hertzian waves due to each disruptive discharge the receiving-circuit can be caused to be in tune or syntony with the transmitting-circuit, thus rendering the system more sensitive and less likely to be interfered with by neighboring systems differently disposed.

The wave length that any system may generate is to a certain extent under command, and it is necessary if parabolic reflectors are to be used to keep the waves short. This can be done by suitably arranging the spark-gap, such as by employing suitably-sized intermediate balls or by placing inductive coils in the arms of the radiating-wires. By thus keeping the length of the waves short the use of parabolic mirrors behind the radiating and receiving wires and within a much shorter distance of said wires than that of their length or half their length is rendered possible. These mirrors, which should be constructed of reticulated metal, such as fine wire-netting or its equivalent, have the effect of reflecting the waves to or receiving them from one definite direction, and thereby restricting the wave or telegraphic effect to a given direction.

The coherer preferably employed is electrically or magnetically controlled in such manner that immediately after a signal has been received the electric or magnetic controlling force decoheres or renders the coherer non-conductive without the intervention of a mechanical tapping device, thereby increasing the speed of signaling.

In order that my invention may be clearly understood and readily carried into effect, I will proceed to describe the same more fully in connection with the accompanying drawings, in which—

Figures 1 and 2 are respectively diagrams of transmitting apparatus and receiving apparatus in which the radiating and receiving wires project vertically into the air. Fig. 3 shows a parabolic mirror in position behind a radiating or a receiving wire arranged according to this invention.

Referring to Figs. 1 and 2, $a$ and $a'$ are the radiating-wires of the transmitting apparatus. $a^2$ $a^3$ are the receiving-wires of the receiving apparatus and are preferably arranged in the same plane with the wires $a$ $a'$. $b$ is the battery and $t$ is the transmitting instrument in the primary circuit of the induction-coil $c$ of the transmitting apparatus. K is a condenser, placed across the high-potential terminals of the secondary winding of the induction-coil c and in parallel with the wires a a'. S S S are the spheres or balls of the sparking device. L L' are inductive coils placed between the terminals of the condenser K and the terminals of the spark-balls S S, the ends of the radiating-wires a a' at one extremity being also respectively connected to the terminals of the said spark-balls. v is a rotary vibrator, of well-known construction, placed in the primary circuit of the coil c. R is the receiving-relay or other receiving instrument. b' is the battery in the circuit of the receiving-relay. d is the coherer in the receiving-relay circuit, to the terminals of which coherer the wires $a^2$ $a^3$ are connected. $L^2$ $L^3$ are inductive resistances placed, respectively, between the terminals of the coherer d and the receiver R and battery b'; but in many cases the resistances $L^2$ $L^3$ are unnecessary, as the relay-winding R usually possesses sufficient inductance of its own. Upon depressing the key of the transmitter t the circuit of the battery b is closed and the primary winding of the coil c is energized through the vibrator v in the well-known manner. For fast-speed signaling this vibrator v, which makes and breaks the currents for the primary winding of coil c, should be kept constantly working whether the coil c is energized or not. When the coil c is thus energized, sparks pass between the balls S, and the Hertzian waves thereby generated are radiated by the wires a a'. The condenser K acts as a storage of power, maintaining the potential at each side of the spark-gap, and thereby increasing the persistence of the Hertzian waves. The coils L L' render slow the oscillation of the charge in the condenser, while permitting the currents from the secondary winding of the coil c to pass steadily to the spark-balls—that is to say, the inductances L L' are of so high an impedance as to slow the oscillation of the charge in the condenser K, say, for example, to a period of one one-thousandth of a second, while the period of the oscillation of the charge from the wires a a' across the spark-gap would be of the order of one ten-millionth of a second. The wires a a' thus easily dissipate the electrical energy long before the charge in the condenser could itself produce even the fraction of one oscillation, and the condenser therefore acts as a steady supply of current to the radiating system. When no signals are received, the coherer d is maintained in a decohered or nonconductive condition in a manner hereinafter fully explained, and the circuit of the receiver R and battery b' is consequently open. When the Hertzian waves cut the wires $a^2$ $a^3$ and induce therein voltages, the surgings thereby created pass through the coherer d, rendering it conductive and closing the circuit of the receiver R and battery b', the signals being recorded by the said receiver. The inductance in the relay-circuit, such as $L^2L^3$, or the inductance possessed by the winding of the relay R itself prevents the surgings created by the Hertzian waves from flowing uselessly round the circuit. The radiating-wires a a' and also the receiving-wires $a^2$ $a^3$ are respectively placed at a distance apart which has a definite relation to the length of the Hertzian waves. This distance may conveniently be approximately half that of a Hertzian wave length, such an arrangement causing the positive radiating-wire to supply the positive crest of the wave at the same time as the negative radiating-wire supplies the negative crest of the wave and the waves to be thus transmitted or received mainly in the direction of the plane of the radiating and receiving wires.

By arranging the inductive coils L L' and the condenser K as above described the Hertzian waves are kept persistent. The radiating and receiving wires being arranged and the persistence of the waves being secured, as above described, permits tuning effects to be produced between the transmitter and receiver, so that they will be more sensitive to one another and will not be likely to be interfered with by differently-disposed neighboring systems. The shortness of the waves enables a parabolic mirror of wire-gauze or its equivalent, as e, Fig. 3, to be placed a short distance (not less than one-fourth of a wave's length) behind the vertical wire or wires for the purpose of reflecting the waves in a definite direction. By constructing this reticulated reflector mainly of a number of vertical wires retained in position by as few horizontal cross-wires as possible the waves radiated are polarized, or the currents which produce them or which they themselves produce in neighboring or distant conductors are made to oscillate in the same plane as the radiating-wires—that is, vertically. Any waves that may be radiated apart from those produced by the currents flowing in the vertical radiating-wires are either turned and radiated by the reflector in such manner as to set up currents in a distant vertical wire or pass through the reflector. The reflector is thus rendered more efficient than a solid screen would be.

What I claim is—

1. In wireless-telegraph apparatus, means for generating etheric waves in combination with a curved mirror comprising parallel wires adapted to reflect the waves in a definite direction.

2. In wireless-telegraph apparatus, means for generating etheric waves in combination with a parabolic mirror comprising parallel wires adapted to reflect the waves in a definite direction.

3. In wireless-telegraph apparatus, means for generating etheric waves in combination with a curved mirror comprising parallel wires forming straight elements thereof and adapted to reflect the waves in a definite direction.

4. In wireless-telegraph apparatus, means for generating etheric waves, in combination with a parabolic mirror comprising parallel wires forming straight elements thereof and adapted to reflect the waves in a definite direction.

5. In wireless-telegraph apparatus, a metallic parabolic mirror composed in the main of vertically-arranged wires adapted to reflect the waves in a definite direction, substantially as herein described.

6. In wireless-telegraph apparatus, the combination of a reticulated metallic parabolic mirror composed principally of vertical wires and a wave-radiating device substantially as herein described.

7. In wireless-telegraph apparatus, the combination of a transmitter, a transmitting-battery and induction-coil, sparking spheres, a wave-radiating device, and a reticulated metallic parabolic mirror composed principally of vertical wires and placed behind said wave-radiating device, substantially as described.

8. In wireless-telegraph apparatus, a receiving instrument, a coherer and a battery in the receiver-circuit, a wave-receiving device and a reticulated metallic parabolic mirror composed principally of vertical wires and placed behind the wave-receiving device, substantially as described for the purpose specified.

9. In wireless-telegraph apparatus, the combination of a transmitter, a transmitting-battery and induction-coil, sparking spheres, a wave-radiating device, a reticulated metallic parabolic mirror composed principally of vertical wires and placed behind the wave-radiating device, a condenser placed across the high-potential terminals of the induction-coil in order to maintain the potential at each side of the spark-gap, inductive coils placed between the terminals of said condenser and the terminals of the spark spheres in order to render slow the oscillation of the charge in the condenser, a receiver, a coherer and a battery in the receiver-circuit, a wave-receiving device and a reticulated metallic parabolic mirror composed principally of vertical wires and placed behind the wave-receiving device, substantially as described for the purpose specified.

10. In wireless-telegraph apparatus, the combination of a transmitter, a transmitting-battery and induction-coil, sparking spheres, two parallel vertical radiating-wires attached one to each terminal of the sparking spheres and placed at a distance of half a wave length apart, a reticulated metallic parabolic mirror placed behind the radiating-wires, a condenser placed across the high-potential terminals of the induction-coil, inductive coils placed between the terminals of said condenser, and the terminals of the spark spheres, a receiving-relay, a coherer in the receiving-relay circuit, two parallel vertical receiving-wires attached one to each terminal of the coherer and placed at a distance of half a wave length apart, and a reticulated metallic parabolic mirror placed behind the receiving-wires, substantially as described, for the purpose specified.

In testimony whereof I have hereunto set my hand, in presence of two subscribing witnesses, this 9th day of January, 1900.

SIDNEY GEORGE BROWN.

Witnesses:
 J. COLLINS,
 WALTER J. SKERTEN.